(12) United States Patent
Shamlian et al.

(10) Patent No.: US 9,375,842 B2
(45) Date of Patent: Jun. 28, 2016

(54) AUTONOMOUS MOBILE ROBOT CONFINEMENT SYSTEM

(71) Applicant: iRobot Corporation, Bedford, MA (US)

(72) Inventors: Steven Shamlian, Watertown, MA (US); Brian Doughty, Framingham, MA (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 14/636,270

(22) Filed: Mar. 3, 2015

(65) Prior Publication Data

US 2015/0328775 A1 Nov. 19, 2015

Related U.S. Application Data

(60) Provisional application No. 61/993,934, filed on May 15, 2014.

(51) Int. Cl.
*B25J 9/16* (2006.01)
*B25J 9/00* (2006.01)
(Continued)

(52) U.S. Cl.
CPC ............. *B25J 9/1676* (2013.01); *A01D 34/008* (2013.01); *B25J 9/0003* (2013.01); *E04H 17/00* (2013.01); *G01S 5/10* (2013.01); *G05D 1/028* (2013.01); *G05D 1/0219* (2013.01); *G05D 1/0225* (2013.01); *G05D 1/0234* (2013.01);
(Continued)

(58) Field of Classification Search
CPC .... B25J 9/1976; B25J 9/0003; A01D 34/008; E04H 17/00; G01S 5/10; G05D 1/0219; G05D 1/0225; G05D 1/0234; G05D 1/0265; G05D 1/028
See application file for complete search history.

(56) References Cited

U.S. PATENT DOCUMENTS 3,713,505 A * 1/1973 Muller ................ G05D 1/0265
15/319
3,924,389 A 12/1975 Kita
(Continued)

FOREIGN PATENT DOCUMENTS

DE 19932552 2/2000
EP 2625946 8/2013
(Continued)

OTHER PUBLICATIONS

Caracciolo L., "Trajectory tracking control of a four-wheel differentially driven mobile robot," IEEE Int. Conf. Robotics and Automation, Detroit, MI, 1999, pp. 2632-2638.
(Continued)

*Primary Examiner* — Nicholas Kiswanto
(74) *Attorney, Agent, or Firm* — Fish & Richardson P.C.

(57) ABSTRACT

A robotic lawnmower confinement system includes at least two dispenser units and a powered unit in wired connection with the at least two dispenser units. Each dispenser unit includes a housing containing a length of boundary wire electrically connected to the housing at one end and terminating at a mating connector for transferring an electrical signal at the opposite end. Each dispenser unit also includes a receiving terminal disposed on the housing for receiving a mating connector of another dispenser unit. The powered unit includes at least one electrical connector configured to connect and deliver current to at least one of the at least two dispenser units. The at least two dispenser units and the powered unit can be arranged and connected to form a loop of connected boundary wires recognizable by the robotic lawnmower.

18 Claims, 14 Drawing Sheets

(51) Int. Cl.
*E04H 17/00* (2006.01)
*A01D 34/00* (2006.01)
*G01S 5/10* (2006.01)
*G05D 1/02* (2006.01)
*A01D 101/00* (2006.01)

(52) U.S. Cl.
CPC .......... *G05D1/0265* (2013.01); *A01D 2101/00* (2013.01); *G05D 2201/0208* (2013.01); *Y10S 901/01* (2013.01)

(56) References Cited

U.S. PATENT DOCUMENTS

| | | | |
|---|---|---|---|
| 3,946,543 | A | 3/1976 | Templeton |
| 4,133,404 | A | 1/1979 | Griffin et al. |
| 4,545,453 | A | 10/1985 | Yoshimura et al. |
| 4,887,415 | A | 12/1989 | Martin |
| 4,909,024 | A | 3/1990 | Jones et al. |
| 5,163,273 | A | 11/1992 | Wojtkowski et al. |
| 5,204,814 | A | 4/1993 | Noonan et al. |
| 5,438,721 | A | 8/1995 | Pahno et al. |
| 5,534,762 | A | 7/1996 | Kim |
| 6,049,745 | A | 4/2000 | Douglas et al. |
| 6,073,427 | A | 6/2000 | Nichols |
| 6,133,730 | A | 10/2000 | Winn |
| 6,140,146 | A | 10/2000 | Brady et al. |
| 6,166,706 | A | 12/2000 | Gallagher et al. |
| 6,339,735 | B1 | 1/2002 | Peless et al. |
| 6,493,613 | B2 | 12/2002 | Peless et al. |
| 6,580,978 | B1 | 6/2003 | McTamaney |
| 6,671,592 | B1 | 12/2003 | Bisset et al. |
| 7,203,576 | B1 | 4/2007 | Wilson et al. |
| 7,873,437 | B2 * | 1/2011 | Aldred ................ G05D 1/0227 700/245 |
| 8,634,960 | B2 | 1/2014 | Sandin et al. |
| 8,781,627 | B2 | 7/2014 | Sandin et al. |
| 8,838,291 | B2 | 9/2014 | Jagenstedt et al. |
| 8,868,237 | B2 | 10/2014 | Sandin et al. |
| 8,930,024 | B2 | 1/2015 | Abramson |
| 8,942,862 | B2 | 1/2015 | Markusson et al. |
| 8,954,193 | B2 | 2/2015 | Sandin et al. |
| 9,043,952 | B2 | 6/2015 | Sandin et al. |
| 9,043,953 | B2 | 6/2015 | Sandin et al. |
| 2001/0047231 | A1 | 11/2001 | Peless et al. |
| 2002/0160845 | A1 | 10/2002 | Simonsen |
| 2003/0023356 | A1 | 1/2003 | Keable |
| 2003/0055337 | A1 | 3/2003 | Lin |
| 2003/0182914 | A1 | 10/2003 | Shibata et al. |
| 2003/0234325 | A1 | 12/2003 | Marino et al. |
| 2004/0036618 | A1 | 2/2004 | Ku et al. |
| 2004/0220000 | A1 | 11/2004 | Falone et al. |
| 2004/0244138 | A1 | 12/2004 | Taylor et al. |
| 2005/0007057 | A1 | 1/2005 | Peless et al. |
| 2005/0020374 | A1 | 1/2005 | Wang |
| 2005/0097952 | A1 | 5/2005 | Steph et al. |
| 2005/0108999 | A1 | 5/2005 | Bucher |
| 2005/0113990 | A1 | 5/2005 | Peless et al. |
| 2005/0278094 | A1 | 12/2005 | Swinbanks et al. |
| 2007/0016328 | A1 | 1/2007 | Ziegler et al. |
| 2008/0039974 | A1 * | 2/2008 | Sandin ................ G05D 1/028 700/258 |
| 2008/0183349 | A1 | 7/2008 | Abramson et al. |
| 2009/0254218 | A1 | 10/2009 | Sandin et al. |
| 2011/0234153 | A1 | 9/2011 | Abramson |
| 2012/0226381 | A1 | 9/2012 | Abramson et al. |
| 2013/0110322 | A1 | 5/2013 | Jagenstedt et al. |
| 2013/0274920 | A1 | 10/2013 | Abramson et al. |
| 2014/0324269 | A1 | 10/2014 | Abramson et al. |
| 2015/0006015 | A1 | 1/2015 | Sandin et al. |
| 2015/0234385 | A1 | 8/2015 | Sandin et al. |

FOREIGN PATENT DOCUMENTS

| | | |
|---|---|---|
| EP | 2667271 | 11/2013 |
| JP | H04320612 | 11/1992 |
| WO | 9938056 | 7/1999 |
| WO | 2011115535 | 9/2011 |
| WO | 2012005642 | 1/2012 |
| WO | 2014129943 | 8/2014 |
| WO | 2014158060 | 10/2014 |
| WO | 2015072896 | 5/2015 |
| WO | 2015094053 | 6/2015 |
| WO | 2015094054 | 6/2015 |
| WO | 2015108454 | 7/2015 |
| WO | 2015115949 | 8/2015 |
| WO | 2015154822 | 10/2015 |
| WO | 2015165506 | 11/2015 |
| WO | 2015169343 | 11/2015 |

OTHER PUBLICATIONS

Kimura et al., "Stuck evasion control for ActiveWheel Passive-Joint snake-like mobile robot 'Genbu,'" Proceedings of the 2004 IEEE International Conference on Robotics 8 Automation, New Orleans, LA Apr. 2004, 6 pages.

Kozlowski and Pazderski, "Modeling and control of a 4-wheel skid-steering mobile robot," International Journal of Applied Mathematics and Computer Science, 2004, 14:477-496.

Matthies et al., "Detecting Water Hazards for Autonomous Off-Road Navigation," Proceedings of SPIE Conference 5083: Unmanned Ground Vehicle Technology V, Orlando, FL, Apr. 2003, pp. 231-242.

Extended European Search Report issued in European Application No. 15157582.6 on Mar. 29, 2016, 6 pages.

* cited by examiner

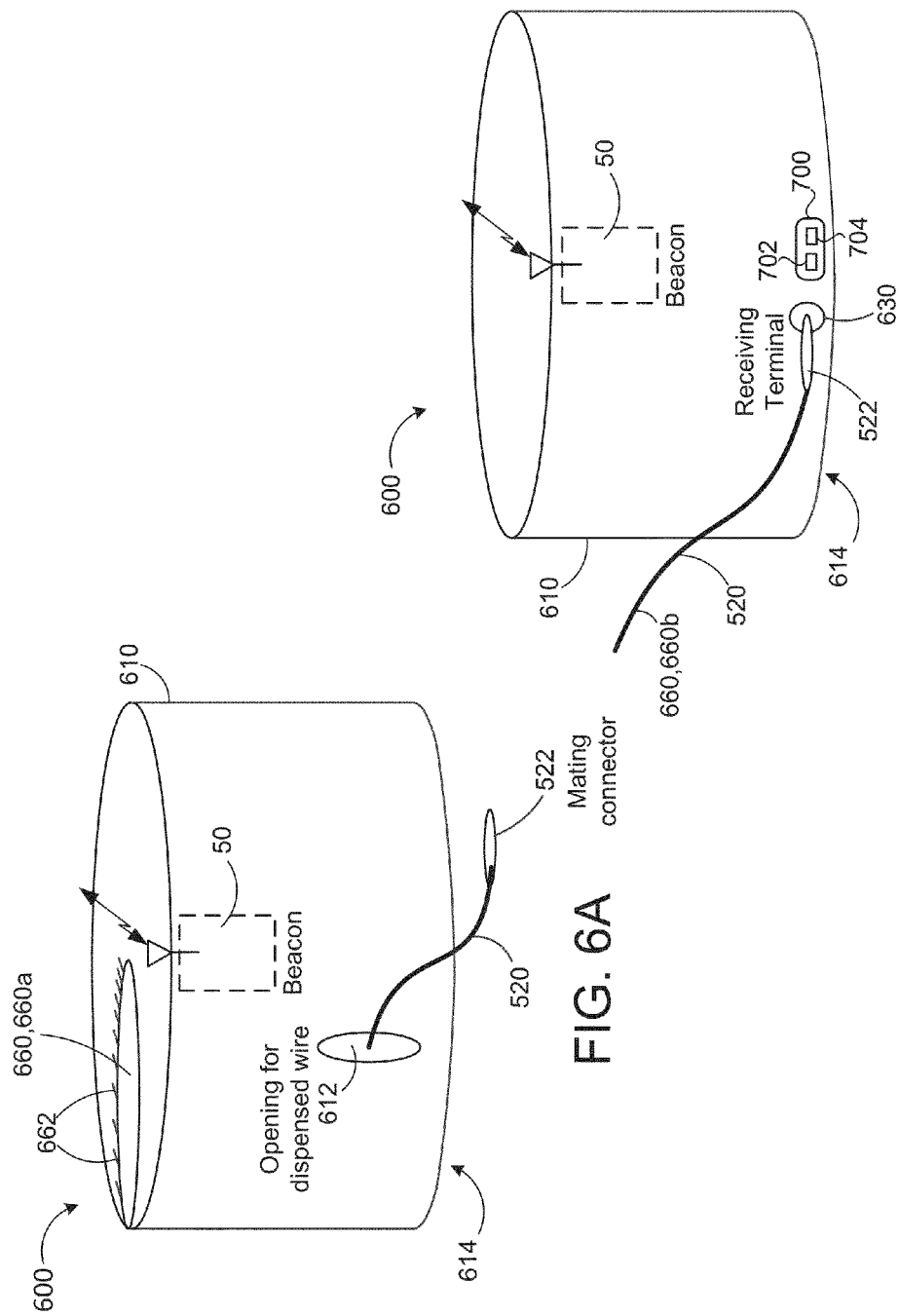

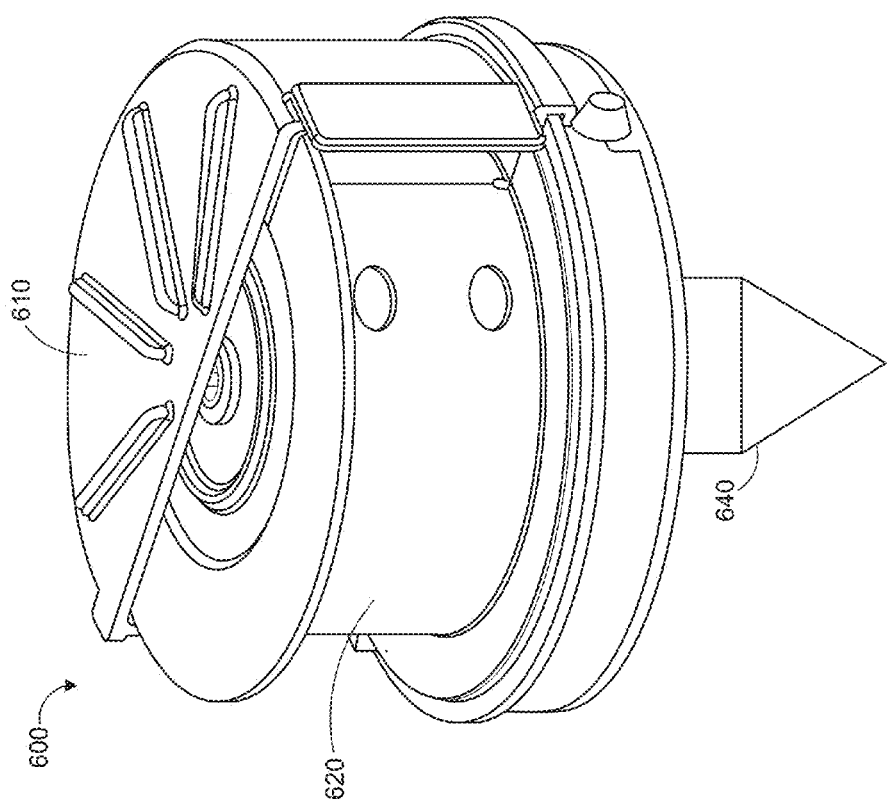

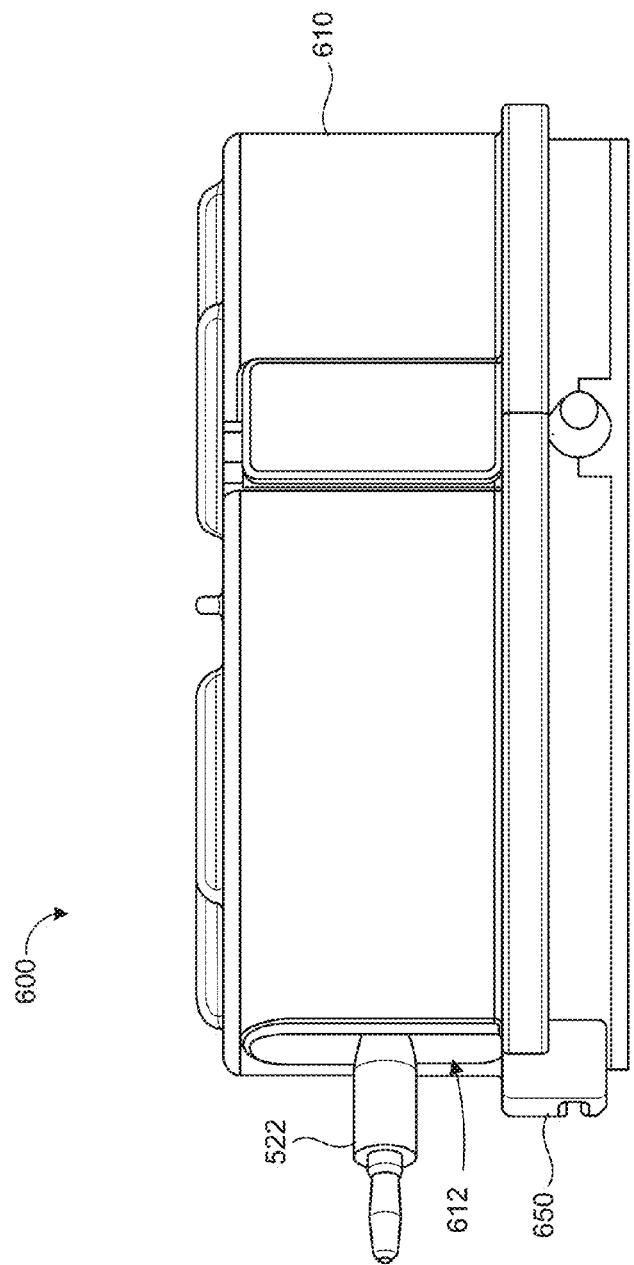

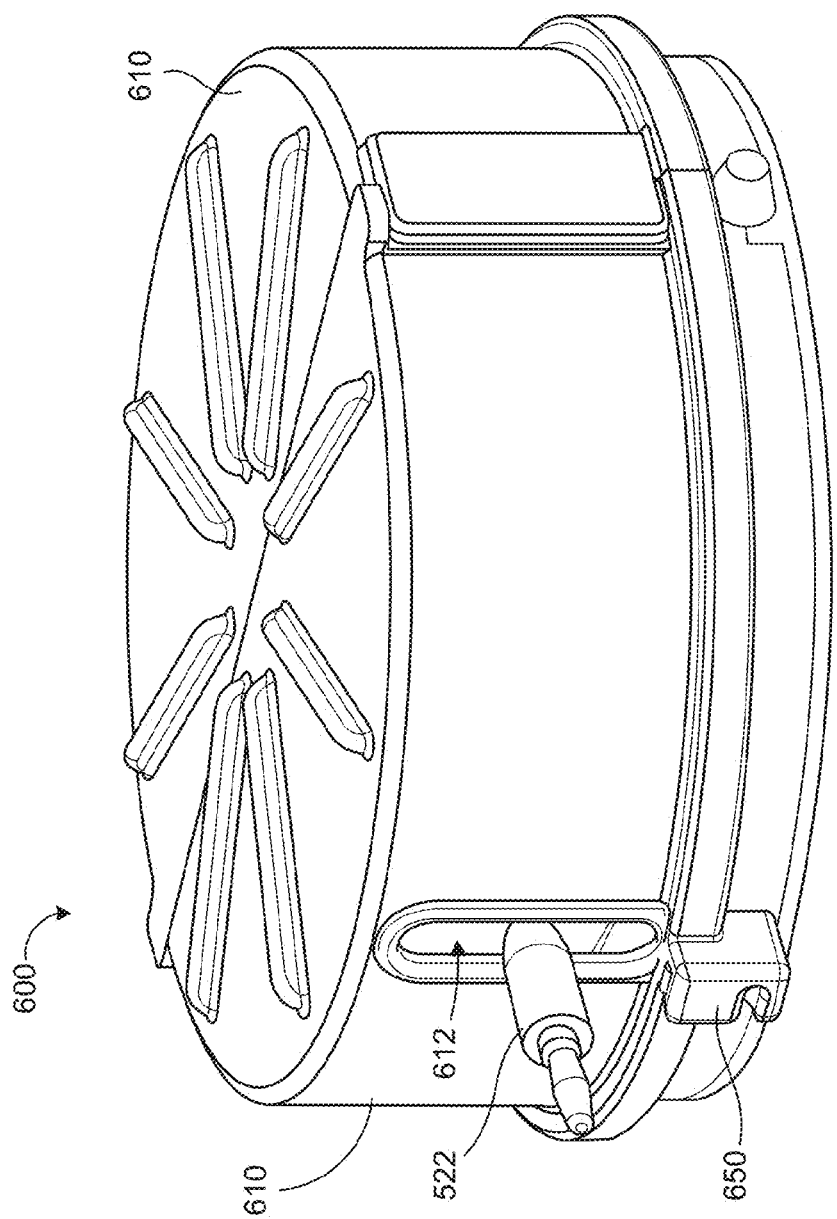

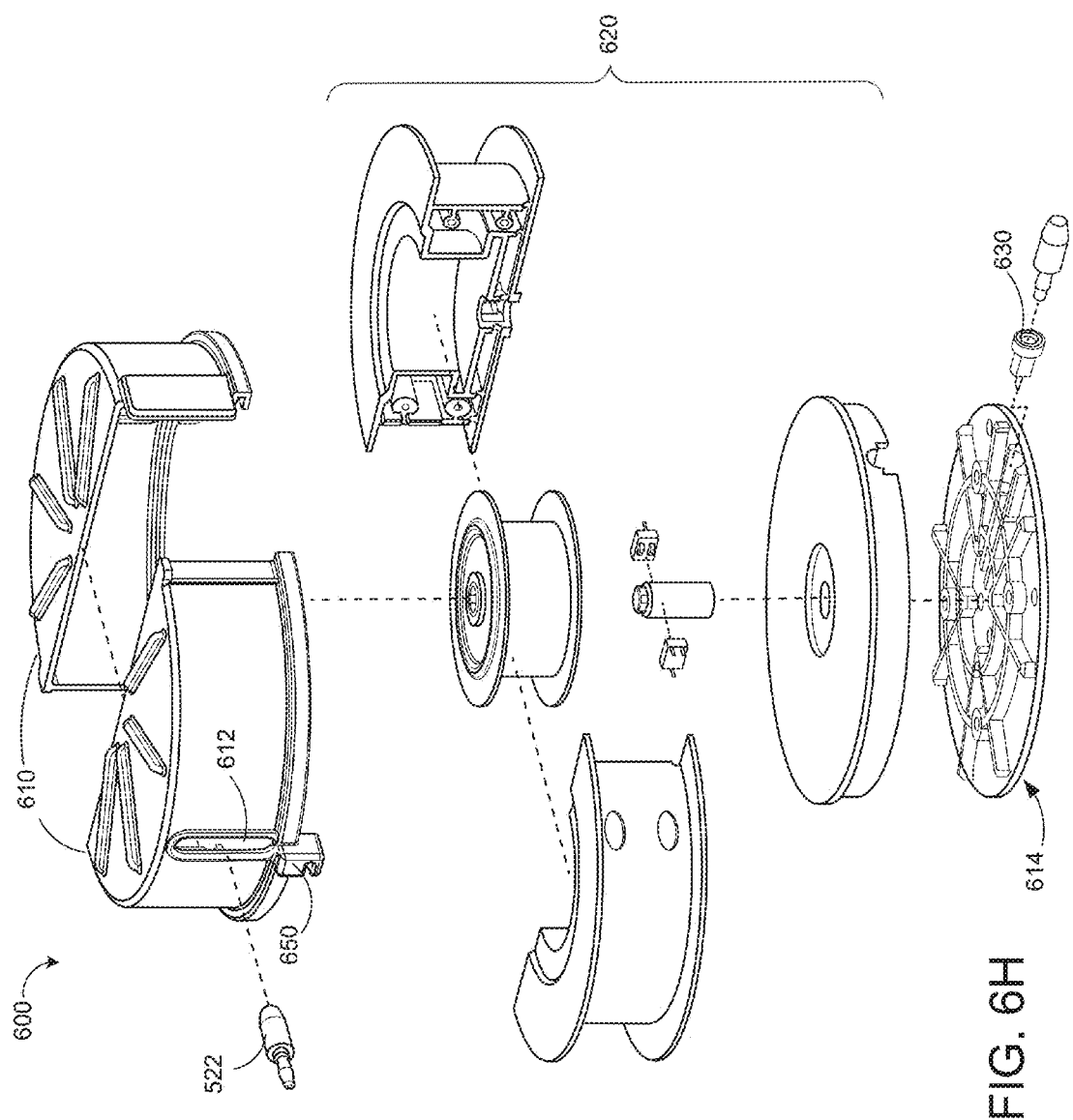

AUTONOMOUS MOBILE ROBOT CONFINEMENT SYSTEM

TECHNICAL FIELD

This disclosure relates to an autonomous mobile robot confinement system.

BACKGROUND

Autonomous robots that perform household functions such as floor cleaning and lawn cutting are now readily available consumer products. Commercially successful robots are not unnecessarily complex, and generally operate randomly within a confined area. In the case of floor cleaning, such robots are generally confined within (i) touched walls and other obstacles within the rooms of a dwelling, (ii) IR-detected staircases (cliffs); and/or (iii) user placed detectable barriers such as directed IR beams, physical barriers or magnetic tape. Walls provide most of the confinement perimeter. Other, much less ubiquitous robots may try to localize or to map the dwelling using a complex system of sensors and/or active or passive beacons (e.g., sonar, RFID or bar code detection, or various kinds of machine vision).

Some consumer robotic lawn mowers use a similar "invisible" barrier—a continuous guide conductor boundary proposed for confining random motion robotic mowers. The guide conductor is intended to confine the robot within the lawn or other appropriate area, so as to avoid damaging non-grassy areas of the yard or intruding onto a neighboring property. The conductor is one continuous loop around the property to be mowed. Although the guide conductor can be drawn into the property in peninsulas to surround gardens or other off limits areas, it remains a continuous loop, and is energized with an AC current detectable as a magnetic field at a few feet. The guide conductor must be supplied with power, usually from a wall socket. Within the bounded area, the known robots may "bounce" randomly as the robot nears the guide conductor, or may follow along the guide conductor. Some of the mowers also touch and bounce from physical barriers. More complex commercial mowers may try to localize or to map the mowing area, again using a complex system of sensors and/or active or passive beacons (e.g., sonar, RF, RSS, TDOA, AOA, NFER, encoded optical retro-reflector detection, machine vision).

SUMMARY

A confinement system for confining an autonomous mobile robot within a work area may include one or more of a boundary wire and beacons arranged in the work area so that when the autonomous mobile robot recognizes the boundary wire and/or beacons, the autonomous mobile robot stays within the work area (e.g., by avoiding or not crossing over the boundary wire and/or beacons). Installation of the boundary wire can be labor intensive. To ease the installation process, dispenser units carrying a dispensable length of boundary wire can be arranged about a boundary of the work area and interconnected using dispensed lengths of boundary wire from each dispensing unit to form a perimeter loop of the work area. Moreover, a powered unit can be connected to the loop of connected boundary wires to deliver a current therethrough.

One aspect of the disclosure provides a confinement system for a robotic Lawnmower. The confinement system includes at least two dispenser units and a powered unit in wired connection with the at least two dispenser units. Each dispenser unit includes a housing containing a length of boundary wire electrically connected to the housing at one end and terminating at a mating connector for transferring an electrical signal at the opposite end. The housing defines an opening for dispensing a variable length of the boundary wire. Each dispenser unit also includes a receiving terminal disposed on the housing for receiving a mating connector of another dispenser unit. The powered unit includes at least one electrical connector configured to connect and deliver current to at least one of the at least two dispenser units. The at least two dispenser units and the powered unit can be arranged and connected to form a loop of connected boundary wires recognizable by a robotic lawnmower. In response to recognizing a boundary wire, the robotic lawnmower may avoid crossing the boundary wire.

Implementations of the disclosure may include one or more of the following optional features. In some implementations, the at least one electrical connector of the powered unit is configured to receive a mating connector of a boundary wire of one of the at least two dispenser units. In some examples, the powered unit includes another boundary wire configured to mate with a receiving terminal of one of the at least two dispenser units. In this case, the boundary wire of the powered unit forms part of the loop of connected boundary wires. The powered unit can deliver a current through the loop of connected boundary wires. The powered unit may include a unit body defining a receiving surface configured to receive the robotic lawnmower in a docked position and a charging system supported by the unit body. The charging system is configured to electrically connect with the robotic lawnmower when the robotic lawnmower is in the docked position. In some examples, the powered unit is an electrical socket (e.g., a wired electrical socket that receives an electrical plug in electrical communication with the boundary wire).

The confinement system optionally includes a beacon disposed on each of the at least two dispenser units and the powered unit. The beacon is configured to transmit a beacon identifier signal to the robotic lawnmower (e.g., which may use the beacon identifier signal for localization of the robotic lawnmower with respect to the beacon). In some implementations, the beacon identifier includes a sequence value corresponding to a sequential position (e.g., 1, 2, 3, ... n) of the corresponding beacon along the connected boundary wires. The at least two dispenser units may communicate over the connected boundary wires to assign the consecutive sequence value to each beacon identifier. After interconnection of the dispenser units using the boundary wires, the dispenser units may determine an ordering of the beacons around the loop of boundary wires and assign a sequential position to each beacon. Each beacon may be configured to emit a localization signal for receipt by the operating robotic lawnmower. The localization signal may allow the robotic lawnmower to calculate a pose of the robotic lawnmower based on at least one of signal strength ranging (SSR), time difference of arrival (TDOA), or an angle of arrival (AOA). In some examples, the localization signal is a radio frequency (RF) signal. In additional examples, the localization signal is an ultra-wide band (UWB) emission.

The dispenser units and the powered unit may each include a transceiver configured to communicate and/or receive a communication signal through the connected boundary wires to/from another one of the dispenser units or the powered unit. The beacons may emit isynchronous localization signals and the communication signal between the at least two dispenser units may be a sync pulse. The isynchronous localization signals may be time of arrival emissions in the ultra-wide radio frequency band.

In some implementations, each dispenser unit includes a rotatable spool housed by the housing and carrying a winding of the corresponding length of boundary wire. The rotatable spool may be spring biased toward a take-in rotation direction and selectively engageable to allow selective retraction of a variable length of boundary wire. Moreover, each dispenser unit may include a stake disposed on the housing for anchoring the dispenser unit to a ground surface.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 6A is a schematic front view of an exemplary dispenser unit for an autonomous lawn care mobile robot confinement system.

FIG. 6B is a schematic rear view of an exemplary dispenser unit for an autonomous lawn care mobile robot confinement system.

FIG. 6C is a perspective partial cross section view of an exemplary dispenser unit.

FIG. 6E is a side view of the exemplary dispenser unit of FIG. 6D.

FIG. 6G is a perspective view of the exemplary dispenser unit of FIG. 6D.

FIG. 6H is a perspective exploded view of the exemplary dispenser unit of FIG. 6D.

Like reference symbols in the various drawings indicate like elements.

DETAILED DESCRIPTION

An autonomous robot may be designed to mow a lawn by moving about the lawn and cutting the grass as it is traversing the lawn. A confinement system can keep the autonomous robot on the lawn, away from hazards, and within a particular work area.

Figure 1:
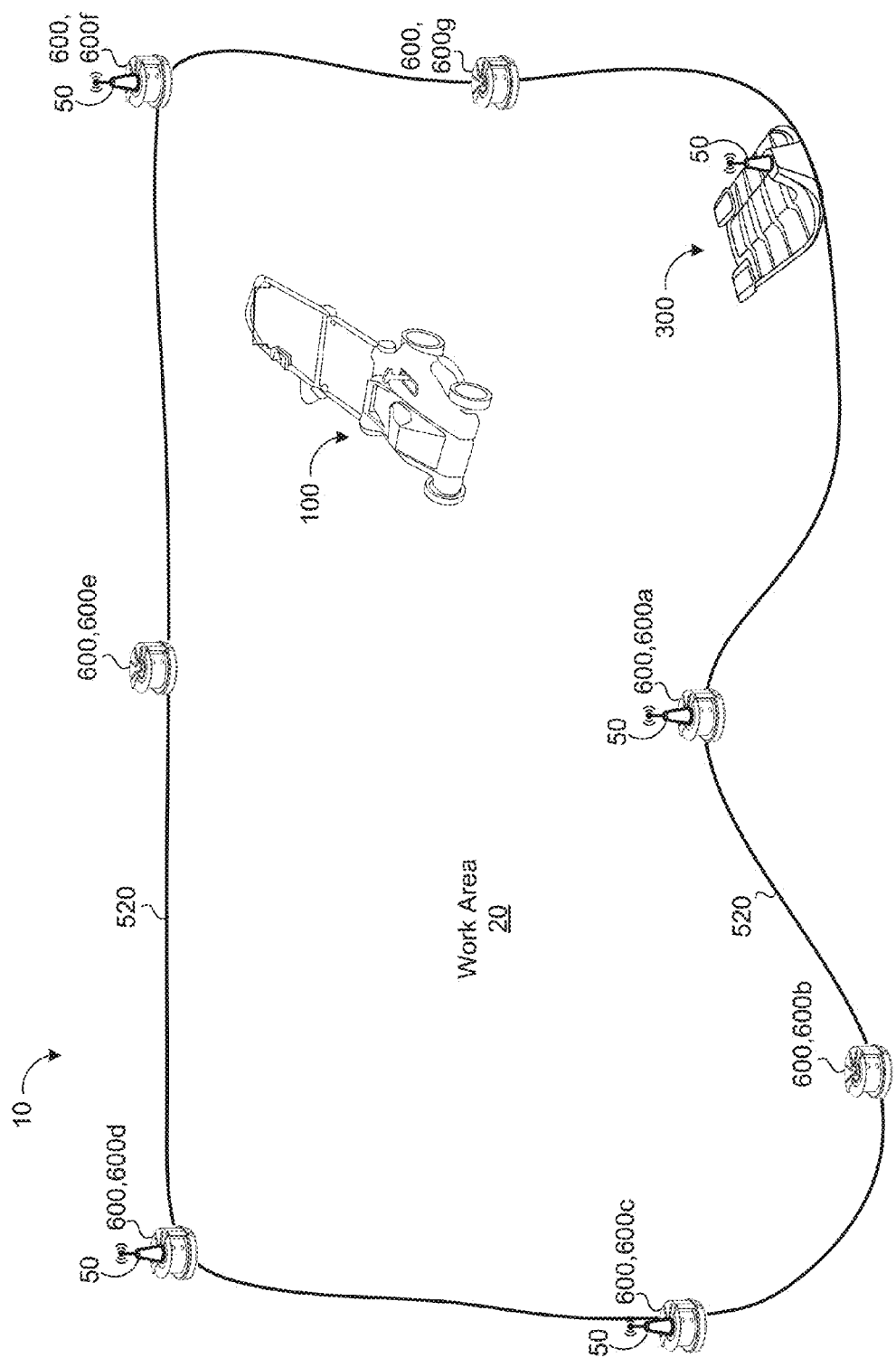
FIG. 1 is a perspective view of an exemplary system including an autonomous lawn care mobile robot, a confinement system, and a base station.

FIG. 1 illustrates an example system 10 that includes an autonomous lawn care mobile robot 100 (also referred to as a robotic lawnmower or simply "the robot"), a docking/charging station 300 (also referred to as abuse station), and confinement system 500 having boundary wire 520 and boundary markers 600, 600a-g recognizable by the robot 100, so that the robot 100 may stay within a work area 20, such as a lawn.

The boundary wire 520 can be arranged in a loop that traces a perimeter 21 of the work area 20. The robot 100 may maneuver about the work area 20 in an autonomous manner while recognizing the boundary wire 520 and/or the boundary markers 600 and staying within the confines established by the boundary wire 520 and the boundary markers 600. For example, the robot 100 may avoid crossing the boundary wire 520. Moreover, one or more boundary markers 600 may include a beacon 50 configured to transmit a beacon identifier signal to the operating robotic lawnmower 100, so that the robotic lawnmower 100 can localize to the boundary markers 600 or within a previously mapped area of the lawn 20.

Figure 2A:
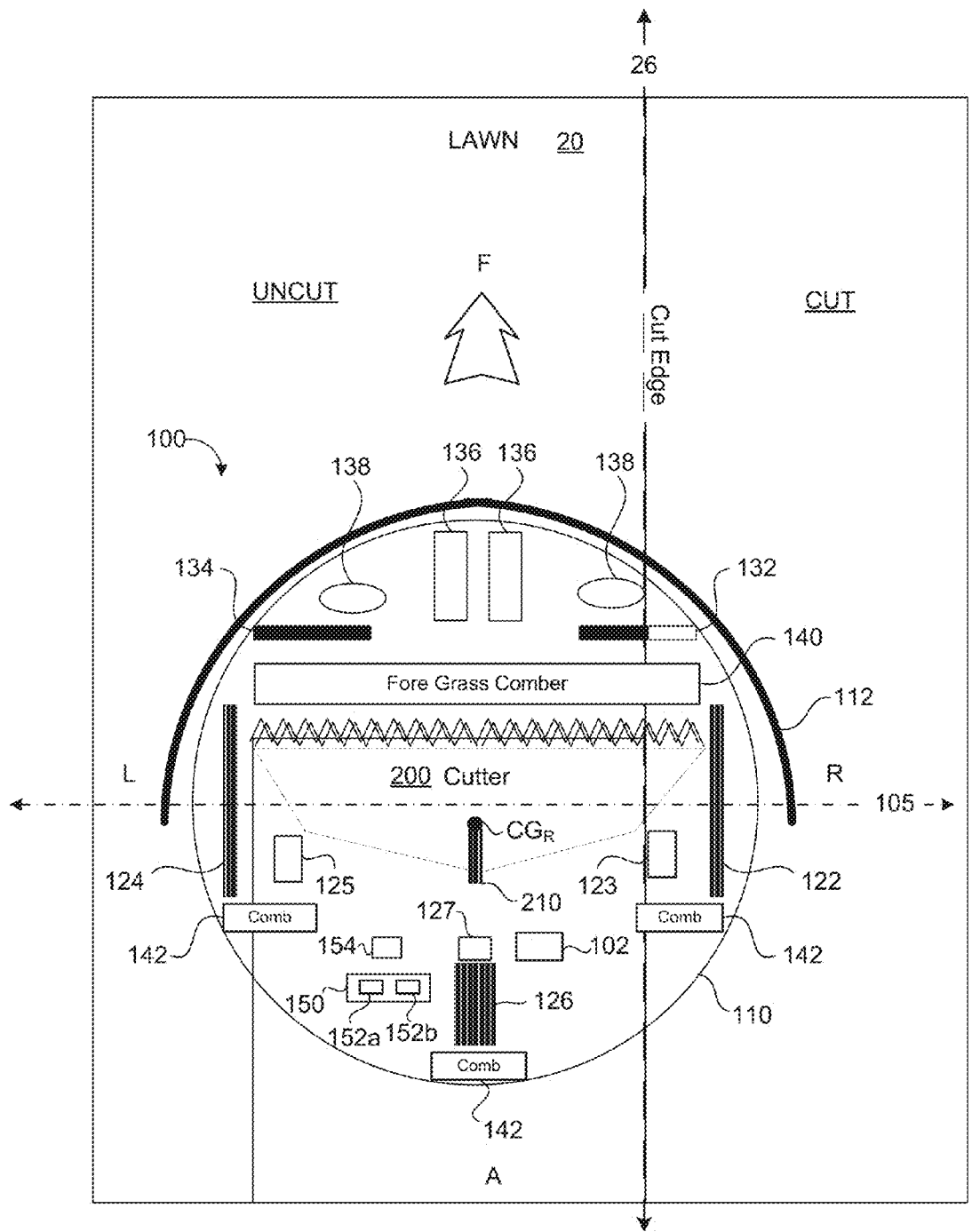
FIG. 2A is a schematic view of an exemplary autonomous lawn care mobile robot.
Figure 2B:
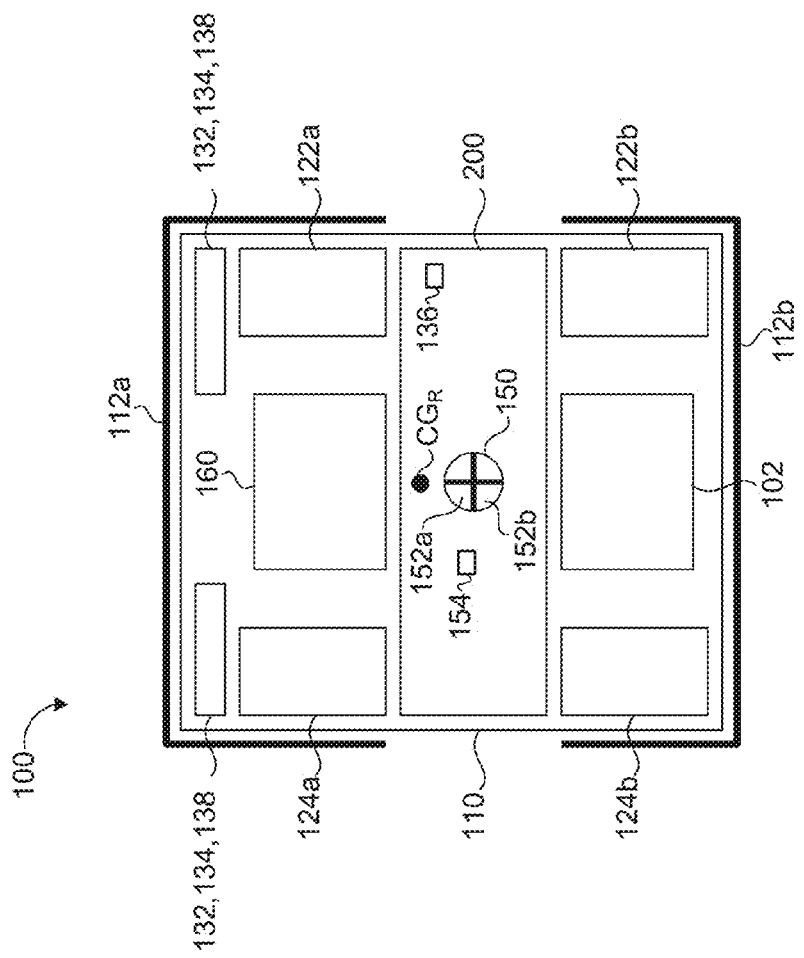
FIG. 2B is a schematic view of an exemplary autonomous lawn care mobile robot.
Figure 2C:
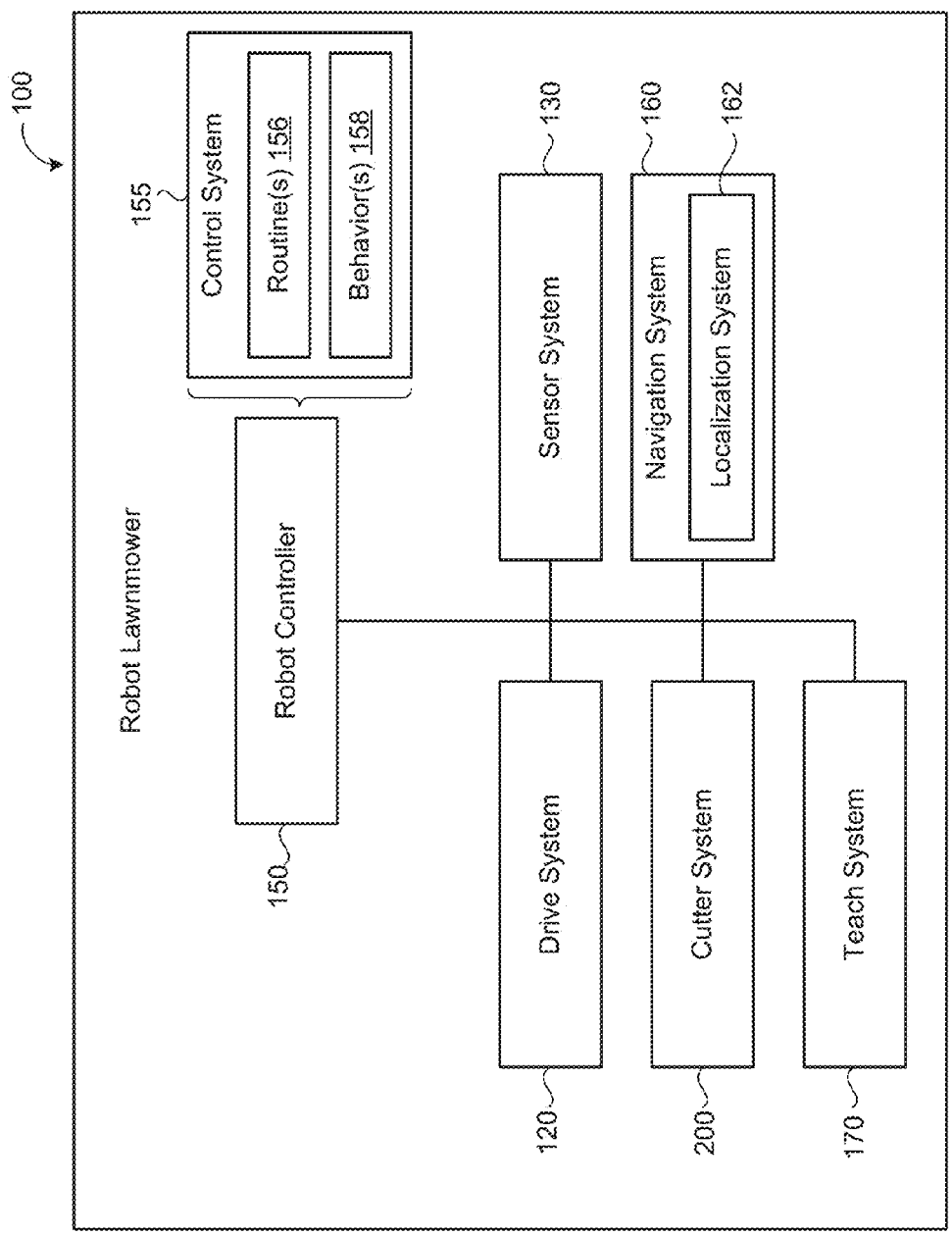
FIG. 2C is a schematic view of an exemplary autonomous lawn care mobile Robot.

Referring FIGS. 2A-2C, in some implementations, the robot 100 includes a body 110 defining a transverse axis 105, a drive system 120, a sensor system 130, and a surface treater 200 supported by the body 110. The drive system 120 is carried by the body 110 and configured to maneuver the robot 100 across a surface 20 (e.g., a lawn). The sensor system 130 may include at least one surface sensor 132, 134, 136 carried by the body 110 and responsive to at least one surface characteristic. Examples of the surface treater 200 include a reciprocating symmetrical cutter floating on a following wheel 210, a rotary cutter, a spreader, and a gatherer. The robot body 110 supports a power source 102 (e.g., a battery) for powering any electrical components of the robot 100.

The body 110, as shown in FIG. 2A, has a substantially circular perimeter, and the body 110 shown in FIG. 2B, had a substantially rectangular perimeter; however, other shapes may be suitable as well, such as a substantially pentagonal, or tombstone shape. In some implementations, the body 110 includes a two part articulated body, each part having a different shape than the other part. For example, the two parts articulated body has a front portion and a rearward portion. The front portion has a circular shape and the rearward portion has a rectangular or square portion. In some implementations, the robot 100 includes a frame-and-body structure or a substantially monocoque structure. Moreover, the body 110 may include a bumper 112 (which may be coupled to two or more displacement sensors of the sensor system 130 to provide impact directionality).

In the example shown in FIG. 2A, the drive system 120 includes right and left drive wheels 122, 124 and optionally a following or supporting wheel 126 (e.g. a caster). In some implementations, the drive system 120 includes at least one drive wheel 122, 124 (optionally 126) rotated by a respective wheel module 123, 125, 127, such as a motor or other drive mechanism (e.g., an electric motor supplied power from a consumer-level battery, fuel cell, large capacitors, microwave receiver, an internal/external combustion engine powered by an onboard fuel source, hydraulic/pneumatic motor powered by an above aforementioned power source, large potential energy sources such as wound or compressed springs such as in hydraulic or pneumatic, vacuum accumulators, flywheels, or compressed air). In the example shown in FIG. 2B, the drive system 120 includes first and second right drive wheels 122a, 122b and first and second left drive wheels 124a, 124b.

Referring to FIG. 2B, the bumper 112 includes a first portion 112a and a second portion 112b. A configuration and height of the bumper 112, in some instances, are arranged according to a ground clearance or a cut height of the cutter 200. The bumper height may be lower than the cut height of the cutter 200 so that a collision with the bumper stops the cutter 200 and prevents damage to stationary or living objects. Also, the bumper 112 may rise and lower with the cutter 200.

With continued reference to FIGS. 2A 2C, the robot 100 includes a robot controller 150 (e.g., a device having one or more computing processors 152a in communication with non-transitory memory 152b capable of storing instructions executable on the computing processor(s) 152a) disposed within the robot body 110. The robot controller 150 (executing a control system 155) may execute routines 156 and behaviors 158 that cause the robot 100 to take an action, such as maneuvering in a wall following manner, or changing its direction of travel when an obstacle is detected. The robot controller 150 can maneuver the robot 100 in any direction across the lawn by independently controlling the rotational speed and direction of each wheel module 123, 125, 127 (FIG. 2A) rotating the wheel 122, 124, 126 respectively. For example, the robot controller 150 can maneuver the robot 100 in the forward F, reverse (aft) A, right R, and left L directions. The robot controller 150 may direct the robot 100 over a substantially random (e.g., pseudo-random) path while traversing the lawn 20. The robot controller 150 can be responsive to one or more sensors (e.g., bump, proximity, wall, stasis, and cliff sensors) disposed about the robot body 110. The robot controller 150 can redirect the wheel modules 123, 125, 127 in response to signals received from sensors (e.g., of the sensor system 130), causing the robot 100 to avoid obstacles and clutter while traversing the lawn 20.

In some implementations, to achieve reliable and robust autonomous movement, the sensor system 130 includes several different types of sensors, which can be used in conjunction with one another to create a perception of the robust environment sufficient to allow the robot 100 to make intelligent decisions about actions to take in that environment. Moreover, the robot 100 may use the sensor system 130 to follow at least one surface characteristic, such as a cut swath 26 of the lawn 20. The robot 100 may follow a surface characteristic using one or more edge following sensors 132 (also referred to as cut edge detectors) and edge calibrators 134 (e.g., a grass character sensor) mounted on the body 110. FIGS. 2A and 2B depicts an exemplary placement of at least one grass sensor 136 (e.g., that determines a presence of grass), boundary sensors 138, and the bumper 112 on the body 110. An active or passive fore grass comber 140 precedes the surface treater 200 and an aft grass comber 142 Wows each wheel 122, 124, 126.

The sensor system 130 may include obstacle detection obstacle avoidance (ODOA) sensors, communication sensors, navigation sensors, etc. The ODOA sensors may include, but are not limited to: a cliff sensor detecting a cliff proximate the robot body 110 or proximate a drive element of the drive system 120; a drop sensor detecting a drop of a drive element (e.g., wheels 122, 124, 126) of the drive system 120; an accelerometer detecting a speed of the robotic lawnmower 100; and/or a confinement sensor determining a proximity of the robotic lawnmower to a boundary marker 600 and/or boundary wire 520. The confinement sensor may include a transmitter, a receive or both a transmitter and receiver depending on the type of confinement system implemented. Additional sensors may include, but are not limited to, proximity sensors, contact sensors, a camera (e.g., volumetric point cloud imaging, three-dimensional (3D) imaging or depth map sensors, visible camera and/or infrared camera), sonar, radar, LIDAR (Light Detection and Ranging, which can entail optical remote sensing that measures properties of scattered to find range and/or other information of a distant target), LIDAR (Laser Detection and Ranging), etc. In some implementations, the sensor system 130 includes ranging sonar sensors, RF receivers, proximity cliff detectors, contact sensors, a laser scanner, and/or an imaging sonar.

In some examples, the sensor system 130 includes an inertial measurement unit (IMU) 154 in communication with the controller 150 to measure and monitor a moment of inertia of the robot 100 with respect to the overall center of gravity $CG_R$ of the robot 100. The MU 154 may monitor a tilt of the robot 100 to allow the robot 100 to avoid mowing or maneuvering above a maximum robot tilt angle. For example, when IMU 154 detects a robot tilt, the robot 100 may compare a measured robot inclination with known values to determine whether it is maneuvering over a threshold, tree roots, humps, hillocks, small hills, or other surface phenomena that may be treated as obstacles, but not easily detectable by bumpers or proximity sensors. The controller 150 may monitor any deviation in feedback from the IMU 154 from a threshold signal corresponding to normal unencumbered operation. For example, if the robot 100 begins to pitch away from an upright position, it may be impeded, or someone may have suddenly added a heavy payload. In these instances, it may be necessary to take urgent action (including, but not limited to, evasive maneuvers, recalibration, and/or issuing an audio/visual warning) in order to assure safe operation of the robot 100.

When accelerating from a stop, the controller 150 may take into account a moment of inertia of the robot 100 from its overall center of gravity $CG_R$ to prevent the robot 100 from tipping. The controller 150 may use a model of its pose, including its current moment of inertia. When payloads are supported, the controller 150 may measure a load impact on the overall center of gravity $CG_R$ and monitor movement of the robot 100 moment of inertia. If this is not possible, the controller 150 may apply a test torque command to the drive system 120 and measure actual linear and angular acceleration of the robot using the IMU 154, in order to experimentally determine safe limits.

In some implementations, the robot 100 includes a navigation system 160 configured to allow the robot 100 to navigate the lawn 20 without colliding into obstacles or going outside a configured perimeter 21 of the lawn 20. In some implementations, the perimeter 21 of the lawn 20 is defined by the loop of boundary wire 520. Moreover, the navigation system 160 can maneuver the robot 100 in deterministic and pseudo-random patterns across the lawn 20. The navigation system 160 may be a behavior based system stored and/or executed on the robot controller 150. The navigation system 160 may communicate with the sensor system 130 to determine and issue drive commands to the drive system 120. The navigation system 160 influences and configures the robot behaviors 158, thus allowing the robot 100 to behave in a systematic preplanned movement. In some examples, the navigation system 160 receives data from the sensor system 130 and plans a desired path for the robot 100 to traverse.

In some implementations, the navigation system 160 includes a localization system 162. The localization system 162 determines a global position of the robot 100 with respect to a global origin and one or more identifiable beacons 50. In some implementations, the global origin coordinates coincide with the base station 300 from which the robot 100 launches a run. In some examples, the localization system 162 stores the global position of the robot 100 in the non-transitory memory 152b, e.g., every threshold period of time, such as, every 10, 20, or 30 seconds, or any other values. In some examples, the localizing system 162 includes the IMU 154 or a global positioning sensor (GPS) for determining the position of the robot 100 with respect to a global origin (e.g., the base station 300 or some other pose of the robot at the start of a run).

Figure 3:
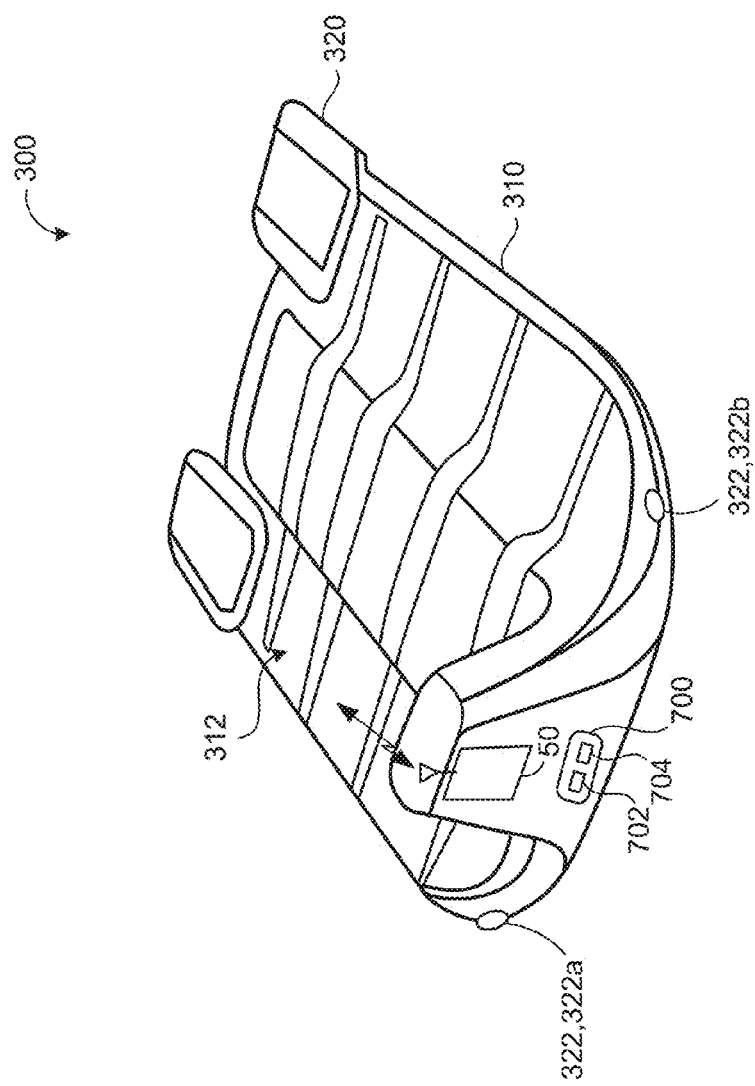
FIG. 3 is a perspective view of an exemplary docking/charging station for an autonomous lawn care mobile robot.

The robotic lawnmower 100 may dock at a base station 300 to recharge the power source 102. FIG. 3 illustrates an example base station 300 having a station body 310 that defines a surface 312 for receiving the robot 100. The base station 300 may include a charging system 320 that electrically connects to the docked robot 100 for wired or wireless charging of the power source 102 of the robot 100. The base station 300 may include one or more electrical connectors 322, 322a, 322b (e.g., in electrical connection with the charging system 320) for electrically connecting to one or more boundary markers 600. In some implementations, the base station 300 includes a beacon 50 housed or supported by the station body 310.

Figure 4:
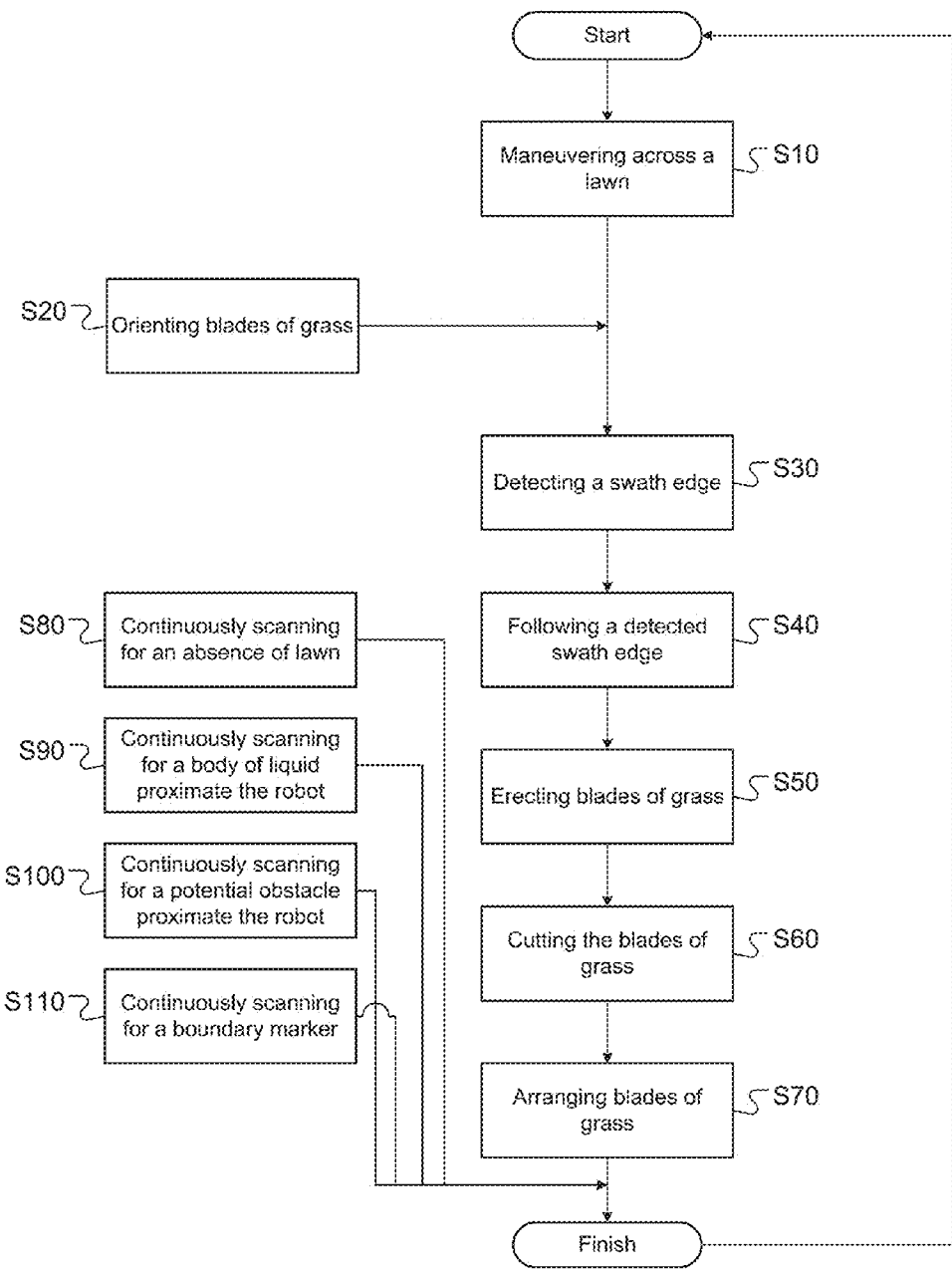
FIG. 4 is a schematic view of a method of lawn cutting with an autonomous lawn care mobile robot.

Referring to FIG. 4, a method of lawn cutting with a robotic lawnmower 100 having a cutter system 200, a sensor system 130, and a drive system 120 carried by a body 110 includes step S10 of activating the drive system 120 to maneuver the robotic lawnmower 100 across a lawn 20, step 530 of detecting a swath edge 26 with the swath edge detector 132, and step 540 of following a detected swath edge 26. The method may include step 520 of orienting blades of grass of the lawn 20 with a grass arranger (e.g., bumper 112 or grass comb 140) carried by the body 110 forward of the swath edge detector 132 carried by the body 110. The method includes step 550 of erecting blades of grass of the lawn 20 with a fore grass comber 140 carried by the body 110 forward of the cutter 200, step S60 of cutting the lawn 20 with the cutter 200, and step 570 of arranging blades of grass of the lawn 20 with an aft grass comber 142 carried by the body 110 rearward of the cutter 200 and/or the drive system 120. In some examples, the method includes one or more of the following steps: step 580 of continuously scanning for an absence of lawn 20 with the lawn detector 136 carried by the body 110, where the drive system 120 redirects the robot 100 in response to detecting an absence of lawn 20; step S90 of continuously scanning for a body of liquid proximate the robot 100 with a liquid detector carried by the body 110, where the drive system 120 redirects the robot 100 in response to detecting a body of liquid; step S100 of continuously scanning for a potential obstacle proximate the robot 100 with a proximity sensor (e.g., infrared sensor, sonar, or time of flight sensor) carried by the body 110, where the drive system 120 redirects the robot 100 in response to detecting a potential obstacle; and step S110 of continuously scanning for a boundary markers 600 with a boundary detector 138 carried by the body 110, where the drive system 120 redirects the robot 100 in response to detecting a boundary marker 600 (discussed below).

Figure 5:
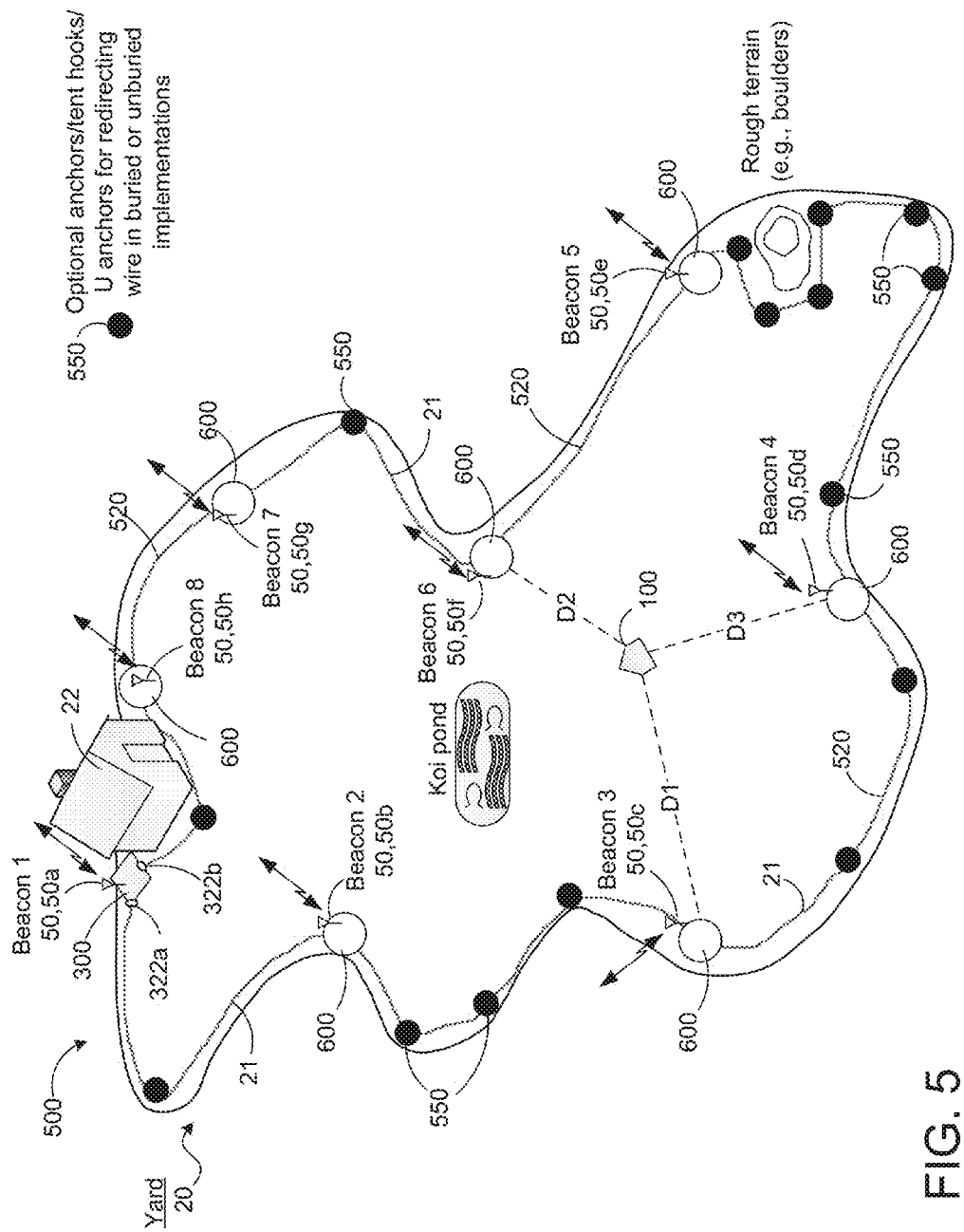
FIG. 5 is a schematic of a yard perimeter bounded by an exemplary confinement system for the autonomous lawn care mobile robot.
Figure 6D:
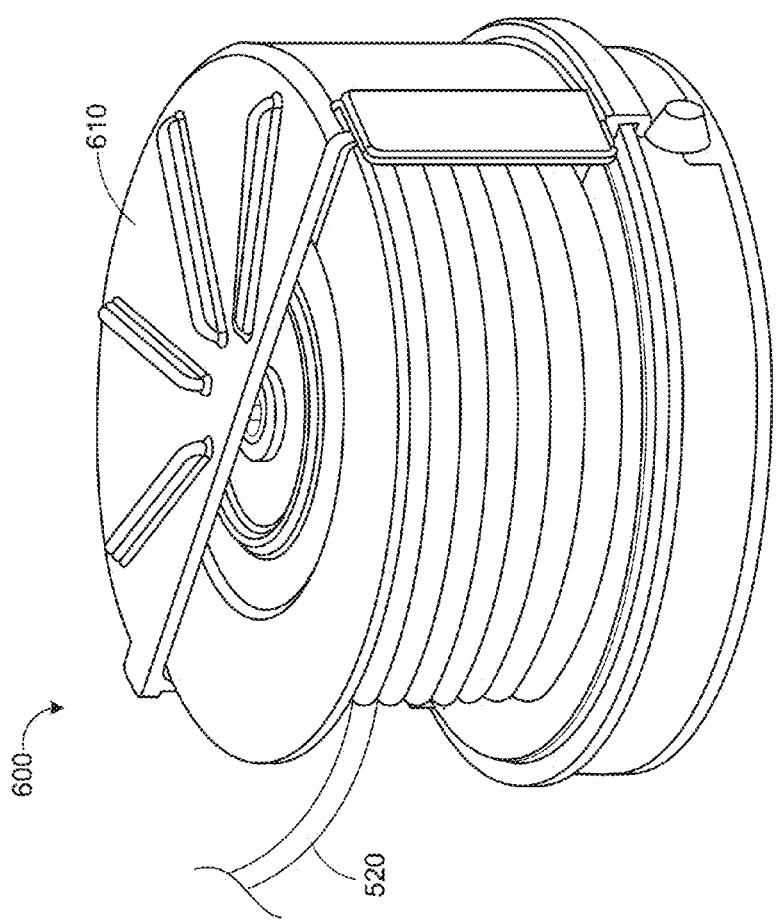
FIG. 6D is a perspective partial cross section view of an exemplary dispenser unit.
Figure 6F:
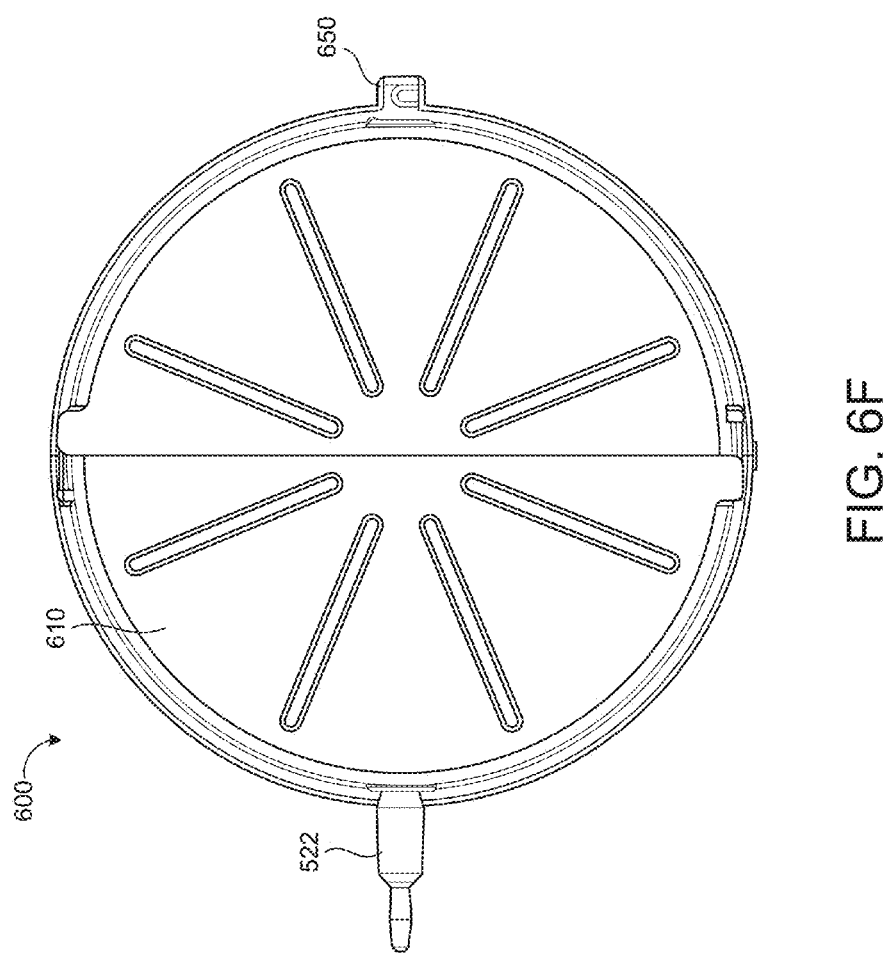
FIG. 6F is a top view of the exemplary dispenser unit of FIG. 6D.

FIG. 5 illustrates an example robotic lawnmower system 10 that includes a robotic lawnmower 100 bounded by a confinement system 500 arranged about a perimeter 21 of a lawn 20 associated with a house 22. The confinement system 500 traces the perimeter 21 of the lawn 20 with a series of boundary markers 600 and boundary wire 520. In some implementations, the boundary markers 600 are dispensing units, each housing dispensable wire 520 and a beacon 50. The dispensing units 600 and the base station 300 can be arranged and connected by the boundary wire 520 to form a loop of connected boundary wires 520 that confines the robotic lawnmower 100 in the work area 20. In the example shown, the dispenser units 600 and boundary wire 520 define a confinement perimeter 21 that the robotic lawnmower 100 avoids crossing while autonomously cutting the lawn 20 in the autonomous mode. Moreover, the beacons 50, 50a-h placed along the perimeter of the lawn 20 aid localization of the robotic lawnmower 100.

Referring to FIGS. 6A-6H, in some implementations, a boundary marker 600 is a dispenser unit 600 including a unit housing 610 containing a length of boundary wire 520 and a beacon 50 in communication with the robotic lawnmower 100. The boundary wire 520 is electrically connected to the dispenser unit 600 (e.g., to the unit housing 610) at one end and terminates in a mating connector 522 at the other end for transferring an electrical signal carried through the boundary wire 520. The mating connector 522 protrudes from or passes through an opening 612 defined by the housing 610.

The dispenser unit 600 allows for dispensing of a variable length of the boundary wire 520 from the unit housing 610. The dispenser unit 600 may include a rotatable spool 620 housed by the unit housing 610 and carrying a winding of the boundary wire 520. The spool 620 may be spring biased toward a take-in rotation direction and selectively engageable to allow selective retraction of a variable length of boundary wire 520. For example, the boundary wire 520 can be retained on a spring biased, retractable spool 620 (e.g., like a window shade) that allows a user to pull a length of boundary wire 520 from the unit housing 610 and release the boundary wire 520 without an automatic re-spooling of the boundary wire 520 back into the unit housing 610 and onto the spool 620. In another example, the dispensed length of boundary wire 520 remains under tension, such that the spring loaded spool 620 pulls the boundary wire 520 taught once the mating connector 522 is inserted into a receiving terminal 630 of a housing 610 of another dispenser unit 600, or an electrical connector 322 of a base station 300 (e.g., recharging dock or other powered unit). Spooled configurations (either manual rewind or automatic retraction) of the dispenser unit 600 facilitate efficient, quick dispensing and retrieval of the boundary wire 520.

In some implementations, the dispenser unit 600 further includes a flat bottom 614 of the unit housing 610 for resting on the ground, or one or more support stakes 640 extending from the bottom 614 of the unit housing 610 for planting in the ground. In some implementations, the one or more support stakes 640 are permanently formed with or joined to the flat bottom 614, and in other implementations, the one or more support stakes 640 re removably secured by a non-permanent fastener, such a threaded screw style mating end, snap fit parts, or a foldable hinge joint for more compact storage and packaging.

Additionally, some implementations of the dispenser unit 600 include a guide tab 650 disposed on an exterior surface of the housing 610 or the flat bottom 614 for holding a boundary wire 520 threaded therein close to the ground and beneath the tips of blades of grass. The guide tab 650 is located in line with the opening 612 through which the boundary wire 520 feeds and is below the opening 612, closer to the ground. By redirecting and holding the boundary wire 520 beneath the grass tips and against the ground, the guide tab 650 helps hide the boundary wire 520 from view and maintain the appearance of the lawn 20. In some implementations, the dispenser unit 600 further includes a set screw for tensioning the spool 620 in spring loaded implementations.

In some implementations, the dispenser unit 600 includes a visible indicator 660 of the remaining length left of boundary wire 520 on the spool 620. In one example, the visible indicator 660 is a visible counter 660a, 660b of how much boundary wire 520 remains on the spool 620. In some implementations, the visible counter 660 is a window 660a formed through the housing 610 for viewing the remaining boundary wire 520, the window 660a having graduated tick marks 662 along its edge indicating how much length of boundary wire 520 remains on the spool 620. In other implementations, the visible counter 660 may be measurement indicia 660b written on the boundary wire 520 or indicated by color coded wire sheathing that alerts a user that only a certain length of boundary wire 520 remains in the housing 610. For example, sheathing on the dispensed boundary wire 520 may change from green to red when only a few meters remain on the spool 620.

The dispenser unit 600 may include a transceiver 700 in communication with the boundary wire 520 for transmitting and receiving communications along the boundary wire 520. The transceiver 700 includes a transmitter 702 and a receiver 704, which may or may not share common circuitry. The base unit 300 may include a transceiver 700 as well for communicating along a connected boundary wire 520.

As depicted in FIG. 5, knowing how much boundary wire 520 remains within the housing 610 of the dispenser unit 600 enables a user to add vertices and bend a length of dispensed boundary wire 520 with an anchor 550, such as a tent hook or a spike with a horizontal groove on top. By hooking the boundary wire 520 in the groove and holding the spike, the user can pull the boundary wire 520 to the side to enclose more space as the boundary wire 520 spools out and runs through the groove as it is translated. The user can then flip the spike over and spike it in the ground when the boundary wire 520 is pulled to the desired angle and location. The spool-to-spool boundary wire 520 is therefore laid out at one or more angles as desired.

In all embodiments of the dispenser unit 600, spring loaded or not, the boundary wire 520 may be pulled slack and laid against the ground before being staked in place with an anchor 550, such a tent hook or U anchor. In some implementations, the dispensed boundary wire 520 can be pinned to the ground along its length and/or buried, In implementations in which the dispensed boundary wire 520 connecting two dispenser units is buried along its length, the boundary wire 520 may be laid in a trench that is later filed or it may be stitched into the ground with a driven hook-and-stitch device that buries the boundary wire 520 between anchors 550 by threading the wire into the ground. By providing the boundary wire 520 on a dispensable spool 620, the boundary wire 520 can unspool from the dispensing unit 600 as the driving hook-and-stitch device pulls the boundary wire 520 and stitches it into the ground. By housing the boundary wire 520 on a spool 620, the dispenser unit 600 allows the user to position a dispensed length of boundary wire 520 without having to worry about dispensing an exact amount. More boundary wire 520 may automatically dispense if the user pulls on the spool 620 while securing the boundary wire 520 along its length. Additionally, in spring loaded implementations, the spool 620 may take up any remaining slack in the dispensed boundary wire 520 once a user has the boundary wire 520 installed between dispensing units 600.

With continued reference to FIG. 5, the confinement system 500 includes at least two dispenser units 600 each housing a length of boundary wire 520 as previously described. The dispenser units 600 are daisy chainable conductor spools. Each dispenser unit 600 includes a receiving terminal 630 for receiving a mating connector 522 of a length of boundary wire 520 extending from another dispenser unit 600 placed such that the two dispenser units are separated by a distance spanned by the boundary wire 520 therebetween. In some implementations, the dispenser units 600 do not house a beacon 50. In other implementations, some or each dispenser unit includes a beacon 50 configured to transmit a beacon identifier signal to the operating robotic lawnmower 100, so that the robotic lawnmower 100 can localize to the dispenser units 600 or within a previously mapped area of the lawn 20 (e.g., previously mapped during a teaching run for a teach and playback system 170 (FIG. 2C)).

In some implementations, the beacon identifier is a sequence value (e.g. 1, 2, 3, . . . n) corresponding to a sequential position of the corresponding dispenser unit 600 or base station 300 along the connected boundary wires 520, and the at least two dispenser units 600 communicate over the boundary wire 520 connecting them to assign a consecutive sequence value to the beacon identifiers. In some implementations, the robot 100 recognizes a nearby beacon 50 using infrared (IR) or another line of sight communication signal and then pairs to the beacon 50 with an RF signal. In other implementations, the confinement system 500 is in wired or wireless communication with a network, and the dispenser units 600 and their associated beacons 50 each have a unique ipv6 address. In some implementations, the dispenser units 600 include other individual identification means perceptible to the robot 100, such as a bar code or encoded signal to enable the robot 100 to localize to the identifiable individual beacons 50. In additional implementations, the robot 100 includes a boundary detection scanner 138 (see FIG. 2A and 2B) disposed on the robot body 110 that is configured to perform a scan match of the perimeter 21 and identify the at least two dispenser units 600 by scan matching. In implementations including dispenser units 600 placed along the perimeter 21 of the lawn 20, the dispenser units 600 are individually identifiable by adjacent scan match data, and the robot 100 is able to localize to the individually identifiable dispenser units 600.

The confinement system 500 may include a powered unit 300 (e.g., the charging station or dock 300) having a beacon 50 configured to transmit a beacon identifier signal to the operating robotic lawnmower 100. The powered unit 300 is in wired connection with the at least two dispenser units 600 via the one or more electrical connectors 322 thereon for completing a loop 21 of boundary wire 520 such that the robot 100 is confined by the loop 21 in an outdoor work area 20. In some implementations, the perimeter loop 21 of boundary wire 520 is a current carrying loop of wire that constrains the robot 100 from going outside its boundaries. The powered unit 300 may be a robotic lawnmower dock and recharging station configured to receive a mating connector 522 of one of the at least two dispenser units 600 and transmit a signal along the closed circuit loop of boundary wire 520. In some examples, the powered unit 300 is configured to mate with a receiving terminal 630 of one of the at least two dispenser units and transmit a current along the dock wire and lengths of boundary wire 520 dispensed from the daisy chained, conducting dispenser units 600. In some examples, the powered unit 300 is an electrical socket (e.g., a wired electrical socket (wall or floor socket) that receives an electrical plug in electrical communication with the boundary wire 520).

In some implementations, the beacons 50 are localization beacons that emit a localization signal for receipt by the robot 100. The robot 100 may use the localization signal to calculate a pose of the robot 100 based on signal strength ranging (SSR), an angle of arrival (AOA), and/or time difference of arrival (TDOA). For example, the robot 100 may include a laser or radar and the beacons 50 receive the signal and transmit back a localization signal for running a TDOA location algorithm. Additionally or alternatively, the localization signal transmitted by the beacon 50 is a radio frequency (RF) emission and, in some implementations, the RF emission is an ultra-wide band (UWB) emission.

The robot 100 may localize by determining an angle and range (e.g., distance D1, D2, D3 as shown in FIG. 5) of the robot 100 to three or more boundary markers 600. In some implementations, the boundary markers 600 are in the line of sight of the robot 100 and configured for LIDAR scan matching, or may include passive LIDAR retro-reflectors (beacons 50) or both of those together. In some examples, the boundary markers 600 are configured fir RADAR scan matching, or may include RADAR retro-reflectors (passive beacons 50) or both. In yet additional examples, the boundary markers 600 include UWB beacons 50. Other types of beacons 50 may also be used in the boundary markers 600, such that the robot 100 may communicate with the boundary markers 600 (e.g., the robot 100 includes a receiver and/or a transmitter communicating with the beacons 50).

The at least, two boundary markers/dispenser units 600 and the powered unit 300 can be daisy chained conductors configured to communicate a transmitted signal through the perimeter loop 21 of boundary wire 520. In some implementations, the beacons 50 of the at least two boundary markers 600 emit isynchronous localization signals, and the communicated transmitted signal between the at least two boundary markers 600 is a sync pulse. In some implementations, the isynchronous localization signals are time of arrival emissions in the ultrawide RF band. The robot 100 may include a localizing system 162 that records each global position of the robot 100 with respect to the beacons 50 of the at least two boundary markers 600 and a work area global origin, such as a location of the powered unit 300.

Various implementations of the systems and techniques described here can be realized in digital electronic and/or optical circuitry, integrated circuitry, specially designed ASICs (application specific integrated circuits), computer hardware, firmware, software, and/or combinations thereof These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A robotic lawnmower confinement system comprising:
    at least two dispenser units, each dispenser unit comprising:
        a housing containing a length of boundary wire electrically connected to the housing at one end and terminating at a mating connector for transferring an electrical signal at the opposite end, the housing defining an opening for dispensing a variable length of the boundary wire; and
        a receiving terminal disposed on the housing for receiving a mating connector of another dispenser unit; and
    a powered unit in wired connection with the at least two dispenser units, the powered unit comprising at least one electrical connector configured to connect and deliver current to at least one of the at least two dispenser units;
    wherein the at least two dispenser units and the powered unit are arranged and connected to form a loop of connected boundary wires recognizable by a robotic lawnmower.

2. The robotic lawnmower confinement system of claim 1, wherein the at least one electrical connector of the powered unit is configured to receive a mating connector of a boundary wire of one of the at least two dispenser units.

3. The robotic lawnmower confinement system of claim 1, wherein the powered unit comprises another boundary wire configured to mate with a receiving terminal of one of the at least two dispenser units.

4. The robotic lawnmower confinement system of claim 1, wherein the powered unit comprises:
    a unit body defining a receiving surface configured to receive the robotic lawnmower in a docked position; and
    a charging system supported by the unit body and configured to electrically connect with the robotic lawnmower, when the robotic lawnmower is in the docked position.

5. The robotic lawnmower confinement system of claim 1, further comprising a beacon disposed on each of the at least two dispenser units and the powered unit, the beacon configured to transmit a beacon identifier signal to the robotic lawnmower.

6. The robotic lawnmower confinement system of claim 5, wherein the beacon identifier signal comprises a sequence value corresponding to a sequential position of the corresponding beacon along the connected boundary wires.

7. The robotic lawnmower confinement system of claim 6, wherein the at least two dispenser units communicate over the connected boundary wires to assign the sequence value to each beacon.

8. The robotic lawnmower confinement system of claim 5, wherein each beacon is configured to emit a localization signal for receipt by the operating robotic lawnmower.

9. The robotic lawnmower confinement system of claim 8, wherein the localization signal allows the robotic lawnmower to calculate a pose of the robotic lawnmower based on at least one of signal strength ranging (SSR), time difference of arrival (TDOA), or an angle of arrival (AOA).

10. The robotic lawnmower confinement system of claim 8, wherein the localization signal comprises a radio frequency (RF) signal.

11. The robotic lawnmower confinement system of claim 10, wherein the localization signal comprises an ultra-wide band (UWB) emission.

12. The robotic lawnmower confinement system of claim 5, wherein the at least two dispenser units and the powered unit each comprise a transceiver configured to communicate and/or receive a communication signal through the connected boundary wires to/from another one of the at least two dispenser units or the powered unit.

13. The robotic lawnmower confinement system of claim 12, wherein the beacons emit isynchronous localization signals and the communication signal between the at least two dispenser units is a sync pulse.

14. The robotic lawnmower confinement system of claim 13, wherein the isynchronous localization signals are time of arrival emissions in an ultra-wide radio frequency band.

15. The robotic lawnmower confinement system of claim 1, wherein each dispenser unit comprises a rotatable spool housed by the housing and carrying a winding of the corresponding length of boundary wire.

16. The robotic lawnmower confinement system of claim 15, wherein the rotatable spool is spring biased toward a take-in rotation direction and selectively engageable to allow selective retraction of a variable length of boundary wire.

17. The robotic lawnmower confinement system of claim 1, wherein each dispenser unit comprises a stake disposed on the housing for anchoring the dispenser unit to a ground surface.

18. The robotic lawnmower confinement system of claim 1, wherein the powered unit comprises an electrical socket.

* * * * *